(12) United States Patent
Kanatani et al.

(10) Patent No.: US 7,171,858 B1
(45) Date of Patent: Feb. 6, 2007

(54) SEMICONDUCTOR PRESSURE SENSOR

(75) Inventors: Masao Kanatani, Tokyo (JP); Masaaki Taruya, Tokyo (JP); Hiroshi Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/319,668

(22) Filed: Dec. 29, 2005

(30) Foreign Application Priority Data

Sep. 12, 2005 (JP) ............................. 2005-263709

(51) Int. Cl.
*G01L 9/00* (2006.01)
(52) U.S. Cl. ..................................................... 73/754
(58) Field of Classification Search .......... 73/700–756; 361/283.1–283.4
See application file for complete search history.

(56) References Cited

U.S. PATENT DOCUMENTS

| 3,817,106 A | * | 6/1974 | Hobel ........................ 73/753 |
| 4,233,848 A | * | 11/1980 | Sato et al. .................... 73/727 |
| 4,366,716 A | * | 1/1983 | Yoshida ....................... 73/718 |
| RE33,028 E | * | 8/1989 | Simpson ...................... 137/82 |
| 5,528,940 A | * | 6/1996 | Yamamoto et al. ........... 73/708 |
| 5,571,970 A | * | 11/1996 | Mutoh et al. ................. 73/724 |

FOREIGN PATENT DOCUMENTS

JP        06-029555 B2    2/1994

* cited by examiner

*Primary Examiner*—Edward Lefkowitz
*Assistant Examiner*—Jermaine Jenkins
(74) *Attorney, Agent, or Firm*—Sughrue Mion, PLLC

(57) ABSTRACT

A semiconductor pressure sensor is intended to achieve reduction in size and cost by decreasing the number of terminals and the number of pads. In the semiconductor pressure sensor, in a first mode in which correction data is input to a memory, a voltage input change-over switch and an input/output change-over switch are operated by an input signal from a switch change-over terminal in such a manner that a voltage input terminal and an input/output terminal are connected to a digital circuit, whereas in a second mode in which an electric signal corrected and amplified is output, the voltage input change-over switch is connected to a semiconductor sensor chip by means of an input signal from the switch change-over terminal, and the input/output terminal is connected to a correction and amplification circuit.

5 Claims, 2 Drawing Sheets

SEMICONDUCTOR PRESSURE SENSOR

BACKGROUND OF THE INVENTION

1. Field of the Invention

The present invention relates to a semiconductor pressure sensor that is used to measure the intake pressure of an automotive engine, for example.

2. Description of the Related Art

In the past, there has been known a semiconductor pressure sensor comprising a semiconductor sensor chip for detecting pressure, and a semiconductor adjustment chip which has a memory storing correction data for correcting an electric signal from the semiconductor sensor chip, and which serves to correct and amplify the electric signal (see, for example, a first patent document: Japanese patent No. 2720718).

This semiconductor pressure sensor is provided with a data input terminal through which the correction data is input to the memory, and a high voltage input terminal which serves as an input terminal to which a high voltage is to be impressed from the outside when digital data is stored or saved into the memory.

In addition, the semiconductor pressure sensor is further provided with a sensor output terminal from which the corrected and amplified sensor output signal is output, and an operating power input terminal from which operating power is supplied to the semiconductor sensor chip at the time of normal operation (when pressure measurement is performed).

In the semiconductor pressure sensor of the above configuration, there are required the data input terminal and the high voltage input terminal, which are only used at the time of initial adjustment, in order to correct an initial error resulting from manufacturing errors, etc., of the semiconductor pressure sensor or an error due to a temperature change, and in addition, it is also necessary to form pads corresponding to those terminals on the semiconductor adjustment chip, thus giving rise to a problem that the semiconductor pressure sensor becomes large-sized and high cost.

SUMMARY OF THE INVENTION

Accordingly, the present invention is intended to obviate the above-mentioned problem, and has for its object is to obtain a semiconductor pressure sensor which can be reduced in size and cost by decreasing the number of terminals and the number of pads.

A semiconductor pressure sensor according to the present invention includes a semiconductor sensor part for detecting pressure; an adjustment and control part including a digital circuit with a memory for storing correction data which is used to correct an electric signal from the semiconductor sensor part, and a correction and amplification circuit that corrects and amplifies the electric signal; an input/output terminal that is connected to an input/output pad mounted on the adjustment and control part for inputting data to the memory and outputting the electric signal corrected and amplified; a voltage input terminal that is connected to a voltage input pad mounted on the adjustment and control part for impressing a voltage to the memory and inputting a voltage as an operating power supply for the semiconductor sensor part; a switch change-over terminal that is connected to a switch change-over pad mounted on the adjustment and control part; a voltage input change-over switch that is connected to the switch change-over pad and the voltage input pad; and an input/output change-over switch that is connected to the switch change-over pad and the input/output pad. In a first mode in which the correction data is input to the memory, the voltage input change-over switch and the input/output change-over switch are operated by an input signal from the switch change-over terminal in such a manner that the voltage input terminal and the input/output terminal are connected to the digital circuit, whereas in a second mode in which the electric signal corrected and amplified is output, by means of an input signal from the switch change-over terminal, the voltage input change-over switch is connected to the semiconductor sensor part and the input/output terminal is connected to the correction and amplification circuit.

According to the semiconductor pressure sensor of the present invention, it is possible to achieve reduction in size and cost by reducing the number of terminals and the number of pads.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings, in which the same or corresponding members or parts are identified by the same symbols.

Embodiment 1

Figure 1:
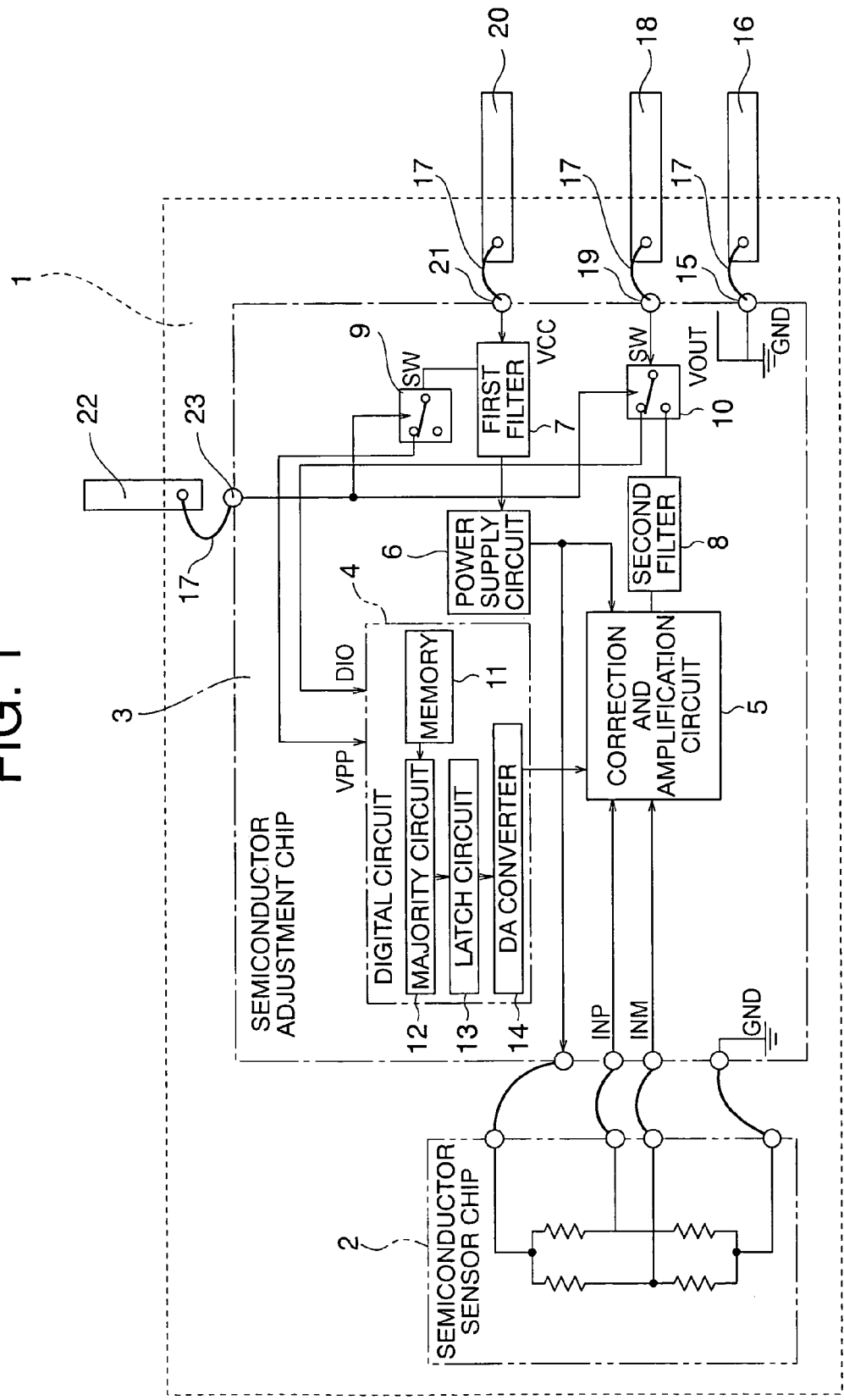
FIG. 1 is a block diagram showing a semiconductor pressure sensor according to a first embodiment of the present invention.

FIG. 1 is a block diagram that shows a semiconductor pressure sensor according to a first embodiment of the present invention.

This semiconductor pressure sensor is provided with a box-shaped case 1, a semiconductor sensor chip 2 mounted on the bottom of the case 1, and a semiconductor adjustment chip 3 that serves to correct and amplify an electric signal from the semiconductor sensor chip 2.

The semiconductor sensor chip 2, being a semiconductor sensor part, is a well-known one using a piezoresistive effect, and serves to detect a pressure from a change in the resistance value of a gauge resistance formed on a diaphragm in accordance with a distortion or strain of a diaphragm, and output it as a pressure sensor signal.

The semiconductor adjustment chip 3, being is an adjustment and control part, is a control part including an amplifier circuit that serves to perform the correction of an initial error resulting from manufacturing errors, etc., of the semiconductor pressure sensor or the correction of errors due to a temperature change and to convert the pressure sensor signal into a desired output voltage.

The semiconductor adjustment chip 3 includes a digital circuit 4, a correction and amplification circuit 5 that corrects the pressure sensor signal, a power supply circuit 6 that stabilizes a power supply for the semiconductor sensor chip 2 and the correction and amplification circuit 5, a first filter 7 that cuts off noise flowing into the power supply circuit 6, a second filter 8 that cuts off noise in the pressure sensor signal, a voltage input change-over switch 9, and an input/output change-over switch 10.

The digital circuit 4 is provided with a memory 11 in which corrected data is stored as digital values, a majority circuit 12, a latch circuit 13 that holds the data of the digital values, and a DA converter 14 that converts the digital values into analog voltage values.

The correction and amplification circuit 5 is provided with an analog circuit that amplifies the pressure sensor signal output, and a signal adjustment circuit that compensates for the characteristic of the pressure sensor signal output.

Here, note that the semiconductor adjustment chip 3 is also provided with a clock signal generation circuit (not shown) that generates a clock signal which serves as a reference signal for the timing at which data is written into the memory 11, and a timing signal generation circuit (not shown ) that generates an input/output timing signal which serves as a trigger signal for reading and writing data.

The semiconductor adjustment chip 3 includes a GND pad 15 electrically connected to a GND terminal 16 through a bonding wire 17, an input/output pad 19 electrically connected to an input/output terminal 18 through a bonding wire 17, a voltage input pad 21 electrically connected to a voltage input terminal 20 through a bonding wire 17, and a switch change-over pad 23 electrically connected to a switch change-over terminal 22 through a bonding wire 17.

The input/output terminal 18 is a terminal from which the pressure sensor signal from the semiconductor sensor ship 2 is output, and it is also a terminal into which digital data is input when the corrected data is written into the memory 11 in the digital values.

The voltage input terminal 20 is an input terminal on which a high voltage is impressed when the corrected data is stored or saved into the memory 11, and it is also an input terminal on which a high voltage is impressed when the semiconductor sensor ship 2 is operated.

The switch change-over pad 23 is connected to the voltage input change-over switch 9 and the input/output change-over switch 10 in such a manner that when a switching signal is input to the switch change-over pad 23 from the switch change-over terminal 22, the voltage input change-over switch 9 and the input/output change-over switch 10 are changed at the same time between a first mode in which the corrected data is written into the memory 11 and a second mode in which the semiconductor sensor ship 2 is operated.

In the semiconductor pressure sensor of the above configuration, in case where the correction of errors such as initial errors resulting from manufacturing errors, etc., i.e., when the corrected data is written into the memory 11, a voltage is impressed on the switch change-over pad 23 from the switch change-over terminal 22 thereby to operate the voltage input change-over switch 9 so as to connect the voltage input terminal 20 to the digital circuit 4, whereby a data writing voltage Vpp is impressed to the memory 11.

In addition, the input/output change-over switch 10 is operated simultaneously with the operation of the voltage input change-over switch 9 thereby to connect the input/output terminal 18 to the digital circuit 4, whereby the corrected data sent from the input/output terminal 18 is input to the memory 11 of the digital circuit 4 through the input/output change-over switch 10.

On the other hand, under normal operation in which pressure measurements are carried out by the semiconductor pressure sensor, a voltage is impressed on the switch change-over pad 23 from the switch change-over terminal 22 thereby to operate the voltage input change-over switch 9 to connect the voltage input terminal 20 to the semiconductor sensor ship 2, whereby a high voltage from the voltage input terminal 20 is impressed, as a control voltage Vcc, to the semiconductor sensor ship 2 through the first filter 7 and the power supply circuit 6.

Moreover, the input/output change-over switch 10 is operated simultaneously with the operation of the voltage input change-over switch 9 to connect the input/output terminal 18 to the semiconductor sensor ship 2, whereby a pressure sensor signal generated by a change in the resistance value of the gauge resistance according to a distortion of a diaphragm is output to the outside through the correction and amplification circuit 5, the second filter 8, the input/output change-over switch 10, the bonding wires 17, and the input/output terminal 18.

According to the semiconductor pressure sensor of this first embodiment, The input/output terminal 18 serves as a dual function terminal, i.e., an output terminal from which the pressure sensor signal from the semiconductor sensor ship 2 is output, and an input terminal into which digital data is input when the corrected data is written into the memory 11 in the digital values, and the voltage input terminal 20 also serves as a dual function terminal, i.e., an input terminal on which a high voltage is impressed when the corrected data is stored or saved into the memory 11, and an input terminal on which a high voltage is impressed when the semiconductor sensor ship 2 is operated, as a result of which the number of terminals and the number of pads can be accordingly reduced, wiring is simplified, and the reduction in size and cost can be achieved.

Embodiment 2

Figure 2:
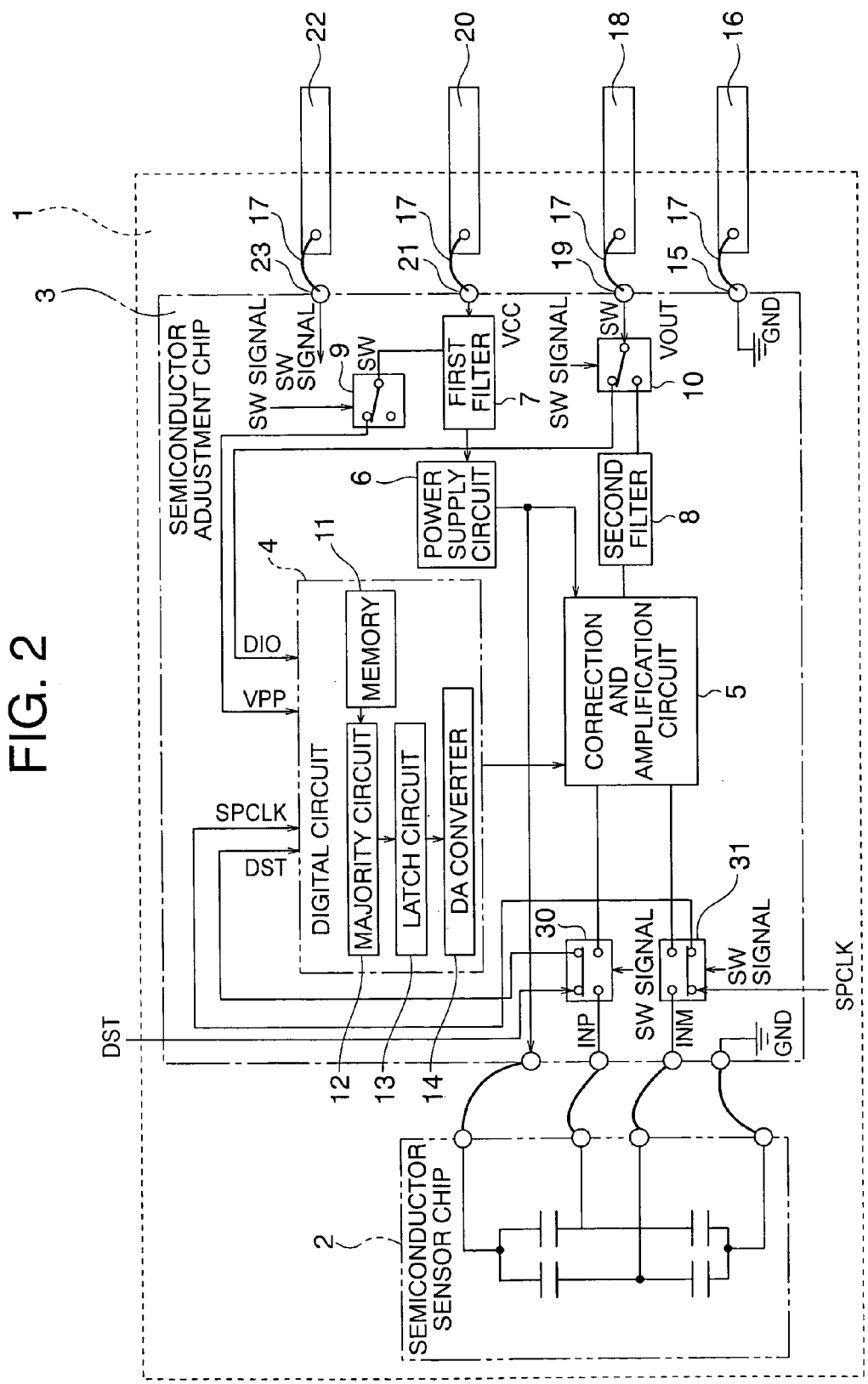
FIG. 2 is a block diagram showing a semiconductor pressure sensor according to a second embodiment of the present invention.

FIG. 2 is a block diagram that shows a semiconductor pressure sensor according to a second embodiment of the present invention.

In this embodiment, a clock signal generation circuit (not shown) and a timing signal generation circuit (not shown) are arranged outside of the semiconductor adjustment chip 3.

The timing signal generation circuit is connected to a timing change-over switch 30 arranged in the semiconductor adjustment chip 3. The timing change-over switch 30 is connected to the correction and amplification circuit 5. The unillustrated clock signal generation circuit is connected to a clock change-over switch 31. The clock change-over switch 31 is connected to the correction and amplification circuit 5.

The construction of the semiconductor pressure sensor according to this second embodiment other than the above is similar to that of the first embodiment.

In this embodiment, when the correction data is written into the memory 11, the timing change-over switch 30 and the clock change-over switch 31 are simultaneously operated together with the voltage input change-over switch 9 and the input/output change-over switch 10. As a result, a timing signal is input to the digital circuit 4 through the timing change-over switch 30, and a clock signal is input to the digital circuit 4 through the clock change-over switch 31.

On the other hand, under normal operation in which pressure measurements are carried out by the semiconductor pressure sensor, the semiconductor sensor chip 2 and the correction and amplification circuit 5 are electrically connected with each other under the action of the timing change-over switch 30 and the clock change-over switch 31, whereby a pressure sensor signal generated by a change in the resistance value of the gauge resistance according to a distortion of a diaphragm is output to the outside through the correction and amplification circuit 5, the second filter 8, the input/output change-over switch 10, the bonding wires 17, and the input/output terminal 18.

The operation of this second embodiment other than the above is the same as that of the semiconductor pressure sensor according to the first embodiment.

According to the semiconductor pressure sensor of this second embodiment, by using the clock change-over switch 31 and the timing change-over switch 30, it becomes possible to arrange the clock signal generation circuit and the timing signal generation circuit outside of the semiconductor adjustment chip 3, so the reduction in size and cost of the semiconductor adjustment chip 3 can be achieved.

In the semiconductor pressure sensor of the second embodiment, the reduction in the number of terminals and the number of pads is made by the use of the voltage input change-over switch 9 and the input/output change-over switch 10, and also the reduction in size and cost of the semiconductor adjustment chip 3 is made by the use of the timing change-over switch 30 and the clock change-over switch 31, but a semiconductor pressure sensor may be constructed by adopting, among the above-mentioned respective switches, the timing change-over switch 30 and the clock change-over switch 31 without adopting the voltage input change-over switch 9 and the input/output change-over switch 10.

In the case of this semiconductor pressure sensor, there have to be provided the data input terminal from which correction data is input to the memory, the high voltage input terminal which serves as an input terminal to which a high voltage is to be impressed from the outside when digital data is stored or saved into the memory, the sensor output terminal from which a corrected and amplified sensor output signal is output, and the operating power input terminal from which operating power is supplied to the semiconductor sensor chip at the time of normal operation, but there is an advantageous effect that the reduction in size and cost of the semiconductor adjustment chip can be achieved.

Further, although in the above-mentioned first and second embodiments, the semiconductor sensor chip 2, which serves as a semiconductor sensor part, and the semiconductor adjustment chip 3, which serves as an adjustment and control part, are formed separately from each other, the semiconductor sensor part and the adjustment and control part may be constructed of an IC that is formed on one and the same chip.

In this case, the semiconductor pressure sensor can be further reduced in size.

While the invention has been described in terms of preferred embodiments, those skilled in the art will recognize that the invention can be practiced with modifications within the spirit and scope of the appended claims.

What is claimed is:

1. A semiconductor pressure sensor comprising:
   a semiconductor sensor part for detecting pressure;
   an adjustment and control part including a digital circuit with a memory for storing correction data which is used to correct an electric signal from said semiconductor sensor part, and a correction and amplification circuit that corrects and amplifies said electric signal;
   an input/output terminal that is connected to an input/output pad mounted on said adjustment and control part for inputting data to said memory and outputting said electric signal corrected and amplified;
   a voltage input terminal that is connected to a voltage input pad mounted on said adjustment and control part for impressing a voltage to said memory and inputting a voltage as an operating power supply for said semiconductor sensor part;
   a switch change-over terminal that is connected to a switch change-over pad mounted on said adjustment and control part;
   a voltage input change-over switch that is connected to said switch change-over pad and said voltage input pad; and
   an input/output change-over switch that is connected to said switch change-over pad and said input/output pad;
   wherein in a first mode in which said correction data is input to said memory, said voltage input change-over switch and said input/output change-over switch are operated by an input signal from said switch change-over terminal in such a manner that said voltage input terminal and said input/output terminal are connected to said digital circuit; and
   in a second mode in which said electric signal corrected and amplified is output, by means of an input signal from said switch change-over terminal, said voltage input change-over switch is connected to said semiconductor sensor part and said input/output terminal is connected to said correction and amplification circuit.

2. The semiconductor pressure sensor as set forth in claim 1, further comprising:
   a clock signal generation circuit that is arranged outside of said adjustment and control part for generating a clock signal which serves as a reference signal for the timing in which data is written into said memory;
   a timing signal generation circuit that is arranged outside of said adjustment and control part for generating an input/output timing signal which serves as a trigger signal for the reading and writing of said correction data;
   a clock change-over switch that is arranged in said adjustment and control part and is connected to said clock signal generation circuit; and
   a timing change-over switch that is arranged in said adjustment and control part and is connected to said timing signal generation circuit;
   wherein in said first mode in which said correction data is input to said memory, said clock change-over switch and said timing change-over switch are operated in such a manner that said clock signal generation circuit and said timing signal generation circuit are electrically connected to said digital circuit, respectively; and
   in said second mode in which said electric signal corrected and amplified is output, said clock change-over switch and said timing change-over switch are operated in such a manner that said semiconductor sensor part is connected to said correction and amplification circuit.

3. The semiconductor pressure sensor as set forth in claim 1, wherein said semiconductor sensor part is composed of a semiconductor sensor chip, and said adjustment and control part is composed of a semiconductor adjustment chip.

4. The semiconductor pressure sensor as set forth in claim 1, wherein said semiconductor sensor part and said adjustment and control part are composed of an IC that is formed on one and the same chip.

5. A semiconductor pressure sensor comprising:

a semiconductor sensor part for detecting pressure;

an adjustment and control part including a digital circuit with a memory for storing correction data which is used to correct an electric signal from said semiconductor sensor part, and a correction and amplification circuit that corrects and amplifies said electric signal;

a clock signal generation circuit that is arranged outside of said adjustment and control part for generating a clock signal which serves as a reference signal for the timing in which data is written into said memory;

a timing signal generation circuit that is arranged outside of said adjustment and control part for generating an input/output timing signal which serves as a trigger signal for the reading and writing of said correction data;

a clock change-over switch that is arranged in said adjustment and control part and is connected to said clock signal generation circuit; and a timing change-over switch that is arranged in said adjustment and control part and is connected to said timing signal generation circuit;

wherein in said first mode in which said correction data is input to said memory, said clock change-over switch and said timing change-over switch are operated in such a manner that said clock signal generation circuit and said timing signal generation circuit are electrically connected to said digital circuit, respectively; and in said second mode in which said electric signal corrected and amplified is output, said clock change-over switch and said timing change-over switch are operated in such a manner that said semiconductor sensor part is connected to said correction and amplification circuit.

* * * * *